United States Patent
Max et al.

(10) Patent No.: US 9,447,974 B2
(45) Date of Patent: Sep. 20, 2016

(54) LIGHT WEIGHT SWIRLER FOR GAS TURBINE ENGINE COMBUSTOR AND A METHOD FOR LIGHTENING A SWIRLER FOR A GAS TURBINE ENGINE

(75) Inventors: Seth A. Max, Manchester, CT (US); Jonathan M. Jause, Manchester, CT (US)

(73) Assignee: United Technologies Corporation, Farmington, CT (US)

(*) Notice: Subject to any disclaimer, the term of this patent is extended or adjusted under 35 U.S.C. 154(b) by 785 days.

(21) Appl. No.: 13/614,657

(22) Filed: Sep. 13, 2012

(65) Prior Publication Data

US 2015/0192300 A1    Jul. 9, 2015

(51) Int. Cl.
| | | |
|---|---|---|
| F23R 3/14 | (2006.01) | |
| F23R 3/28 | (2006.01) | |
| F23R 3/12 | (2006.01) | |
| F23R 3/04 | (2006.01) | |
| F23R 3/10 | (2006.01) | |

(52) U.S. Cl.
CPC ............. *F23R 3/286* (2013.01); *F23R 3/12* (2013.01); *F23R 3/14* (2013.01); *F23R 3/04* (2013.01); *F23R 3/10* (2013.01); *F23R 2900/00017* (2013.01); *F23R 2900/00018* (2013.01); *Y02T 50/675* (2013.01)

(58) Field of Classification Search
CPC ............. F23R 3/04; F23R 3/10; F23R 3/12; F23R 3/14; F23R 3/286; F05D 2260/14
See application file for complete search history.

(56) References Cited

U.S. PATENT DOCUMENTS

| | | | |
|---|---|---|---|
| 4,180,974 A * | 1/1980 | Stenger et al. | 60/748 |
| 4,689,961 A | 9/1987 | Stratton | |
| 4,754,600 A * | 7/1988 | Barbier et al. | 60/39.23 |
| 4,763,482 A | 8/1988 | Wehner | |
| 5,916,142 A | 6/1999 | Snyder et al. | |
| 6,272,865 B1 | 8/2001 | Clark et al. | |
| 6,735,950 B1 | 5/2004 | Howell et al. | |
| 6,823,677 B2 | 11/2004 | Prociw et al. | |
| 7,028,484 B2 | 4/2006 | Prociw et al. | |
| 7,134,286 B2 | 11/2006 | Markarian et al. | |
| 7,140,189 B2 | 11/2006 | Markarian et al. | |
| 7,334,410 B2 | 2/2008 | Creighton et al. | |

(Continued)

FOREIGN PATENT DOCUMENTS

FR     2948749 A1    2/2011

OTHER PUBLICATIONS

EP search report for EP13837928.4 dated Aug. 26, 2015.

*Primary Examiner* — Gerald L Sung
*Assistant Examiner* — Scott Walthour
(74) *Attorney, Agent, or Firm* — O'Shea Getz P.C.

(57) ABSTRACT

The disclosure is directed to a swirler body for a combustor of a gas turbine engine, where the swirler body includes an annular mount face which defines at least one pocket. The disclosure is directed to a swirler assembly for a combustor of a gas turbine engine, where the swirler assembly includes a swirler first body with an annular first mount face which defines at least one first pocket and a swirler second body with an annular second mount face which abuts said annular first mount face, where said second annular mount face defines at least one second pocket. The disclosure is directed to a method of lightening a swirl assembly for a combustor of a gas turbine engine, where the method includes defining at least one pocket within an annular mount face of a swirler body.

13 Claims, 12 Drawing Sheets

(56) References Cited

U.S. PATENT DOCUMENTS

| | | |
|---|---|---|
| 7,478,534 B2 | 1/2009 | Guezengar et al. |
| 7,509,809 B2 | 3/2009 | Patel et al. |
| 7,554,914 B1 | 6/2009 | Li et al. |
| 7,565,803 B2 | 7/2009 | Li et al. |
| 7,669,421 B2 | 3/2010 | Saitoh et al. |
| 7,721,436 B2 | 5/2010 | Prociw et al. |
| 7,721,437 B2 | 5/2010 | Howell et al. |
| 7,926,280 B2 | 4/2011 | Morenko et al. |
| 8,033,113 B2 | 10/2011 | Patel et al. |
| 8,056,232 B2 | 11/2011 | Patel et al. |
| 8,096,132 B2 | 1/2012 | Huang et al. |
| 8,099,867 B2 | 1/2012 | Patel et al. |
| 8,127,550 B2 | 3/2012 | Harris, Jr. et al. |
| 2002/0112480 A1* | 8/2002 | McMillan ............ F23R 3/286 60/737 |
| 2002/0122480 A1 | 9/2002 | Abnous et al. |
| 2006/0207258 A1* | 9/2006 | Tanner et al. .................. 60/748 |
| 2007/0017224 A1* | 1/2007 | Li et al. ......................... 60/748 |
| 2008/0271703 A1 | 11/2008 | Armstrong et al. |
| 2009/0111063 A1* | 4/2009 | Boardman et al. ............... 431/8 |
| 2009/0142716 A1 | 6/2009 | Jubb et al. |
| 2012/0047899 A1 | 3/2012 | Bourgois et al. |

\* cited by examiner

LIGHT WEIGHT SWIRLER FOR GAS TURBINE ENGINE COMBUSTOR AND A METHOD FOR LIGHTENING A SWIRLER FOR A GAS TURBINE ENGINE

BACKGROUND

The present disclosure relates to a gas turbine engine and, more particularly, to a swirler therefor.

Gas turbine engines, such as those that power modern commercial and military aircraft, include a compressor to pressurize airflow, a combustor to burn a hydrocarbon fuel in the presence of the pressurized airflow, and a turbine to extract energy from the resultant combustion gases.

The combustor generally includes radially spaced inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel nozzles project into a forward section of the combustion chamber through a respective fuel nozzle swirler to supply the fuel to be mixed with the pressurized air.

SUMMARY

A swirler body for a combustor of a gas turbine engine according to one disclosed non-limiting embodiment of the present disclosure includes an annular mount face which defines at least one pocket.

In a further embodiment of the foregoing embodiment, the swirler body includes a first slot and a second slot which are generally radial with respect to a centerline of said swirler body, the at least one pocket between the first slot and the second slot.

In a further embodiment of any of the foregoing embodiments, the at least one pocket extends through an outer surface of the swirler body.

A swirler assembly for a combustor of a gas turbine engine according to another disclosed non-limiting embodiment of the present disclosure includes a swirler first body with an annular first mount face which defines at least one first pocket, and a swirler second body with a second annular mount face which abuts the annular first mount face, the second annular mount face defines at least one second pocket.

In a further embodiment of any of the foregoing embodiments, the swirler first body includes a first slot and a second slot which are generally radial with respect to a centerline of said swirler first body, the at least one pocket between the first slot and the second slot. In the alternative or additionally thereto, the swirler second body includes a first slot and a second slot which are generally radial with respect to a centerline of said swirler second body, the at least one pocket between the first slot and the second slot.

In the alternative or additionally thereto, the outer surface is cylindrical.

In a further embodiment of any of the foregoing embodiments, a guide housing is mounted to the swirler first body. In the alternative or additionally thereto, the nozzle guide is mounted to the guide housing.

In the alternative or additionally thereto, a capture plate is mounted to the guide housing to retain the nozzle guide, the nozzle guide movable with respect to the guide housing.

In the alternative or additionally thereto, a capture plate is mounted to the guide housing to retain the nozzle guide.

In the alternative or additionally thereto, the capture plate is annular.

In the alternative or additionally thereto, the capture plate includes a non-circular inner periphery.

In the alternative or additionally thereto, the capture plate includes a scalloped inner periphery.

A method of lightening a swirler assembly for a combustor of a gas turbine engine according to another disclosed non-limiting embodiment of the present disclosure includes at least one pocket within an annular mount face of a swirler body.

In a further embodiment of the foregoing embodiment, the method includes defining at least one pocket completely within the annular mount face.

In a further embodiment of any of the foregoing embodiments, the method includes defining at least one pocket adjacent to a slot.

In a further embodiment of any of the foregoing embodiments, the method includes at least one pocket through an outer surface of the swirler body.

In a further embodiment of any of the foregoing embodiments, the method includes defining at least one pocket adjacent to a second pocket in a swirler second body.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
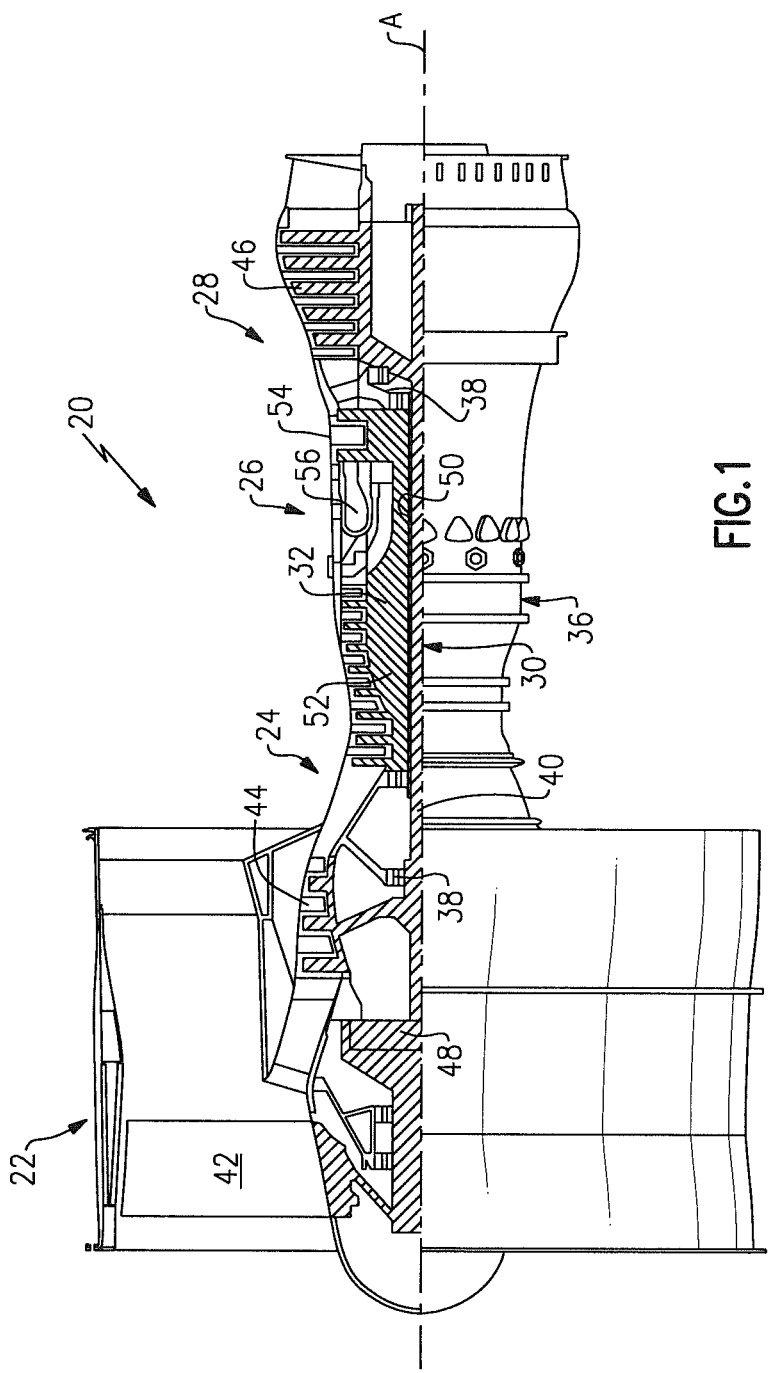
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by bearing structures 38 within the static structure 36. It should be understood that various bearing structures 38 at various locations may alternatively or additionally be provided.

Figure 2:
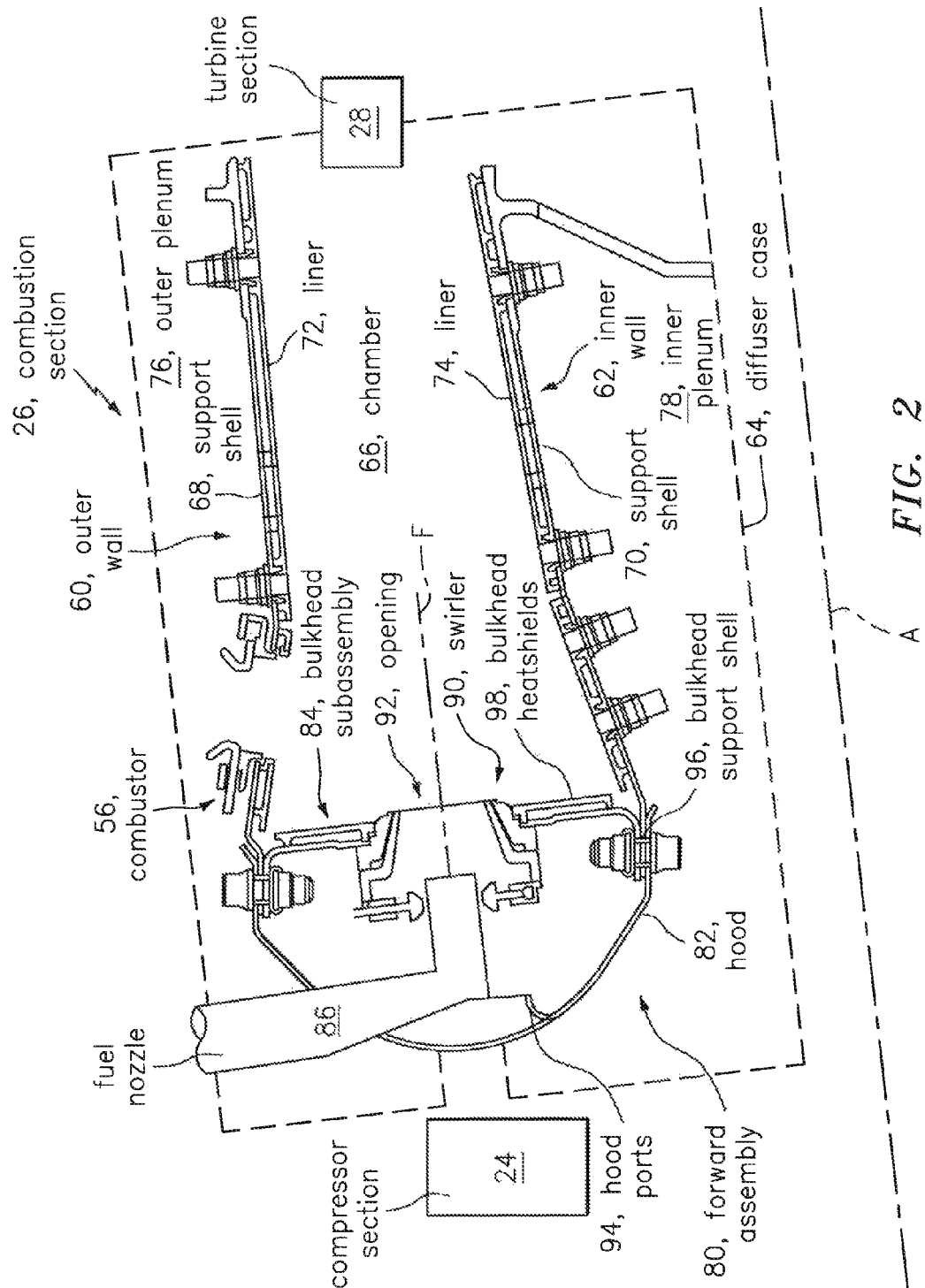
FIG. 2 is a partial sectional view of an exemplary annular combustor that may be used with the gas turbine engine shown in FIG. 1.

With reference to FIG. 2, the combustor 56 generally includes a combustor outer wall 60 and a combustor inner wall 62. The outer wall 60 and the inner wall 62 are spaced inward from a diffuser case 64 such that a chamber 66 is defined therebetween. The chamber 66 is generally annular in shape and is defined between combustor walls 60, 62.

The outer wall 60 and the diffuser case 64 define an annular outer plenum 76 and the inner wall 62 and the diffuser case 64 define an annular inner plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Each wall 60, 62 generally includes a respective support shell 68, 70 that supports one or more respective liners 72, 74 mounted to a hot side of the respective support shell 68, 70. The liners 72, 74 define a liner array that may be generally annular in shape. Each of the liners 72, 74 may be generally rectilinear and manufactured of, for example, a nickel based super alloy or ceramic material.

The combustor 56 further includes a forward assembly 80 immediately downstream of the compressor section 24 to receive compressed airflow therefrom. The forward assembly 80 generally includes an annular hood 82, a bulkhead subassembly 84, a multiple of fuel nozzles 86 (one shown) and a multiple of swirlers 90 (one shown) that defines a central opening 92. The annular hood 82 extends radially between, and is secured to, the forwardmost ends of the walls 60, 62. The annular hood 82 includes a multiple of circumferentially distributed hood ports 94 that accommodate the respective fuel nozzle 86 and introduce air into the forward end of the chamber 66. The centerline of the fuel nozzle 86 is concurrent with the centerline F of the respective swirler 90. Each fuel nozzle 86 may be secured to the diffuser case 64 to project through one of the hood ports 94 and through the central opening 92 within the respective swirler 90.

Each swirler 90 is circumferentially aligned with one of the hood ports 94 to project through the bulkhead subassembly 84. Each bulkhead subassembly 84 includes a bulkhead support shell 96 secured to the walls 60, 62, and a multiple of circumferentially distributed bulkhead heatshields 98 secured to the bulkhead support shell 96 around the central opening 92.

The forward assembly 80 directs a portion of the core airflow into the forward end of the chamber 66 while the remainder enters the annular outer plenum 76 and the annular inner plenum 78. The multiple of fuel nozzles 86, swirler 90 and surrounding structure generate a swirling, intimately blended fuel-air mixture that supports combustion in the chamber 66.

Figure 3:
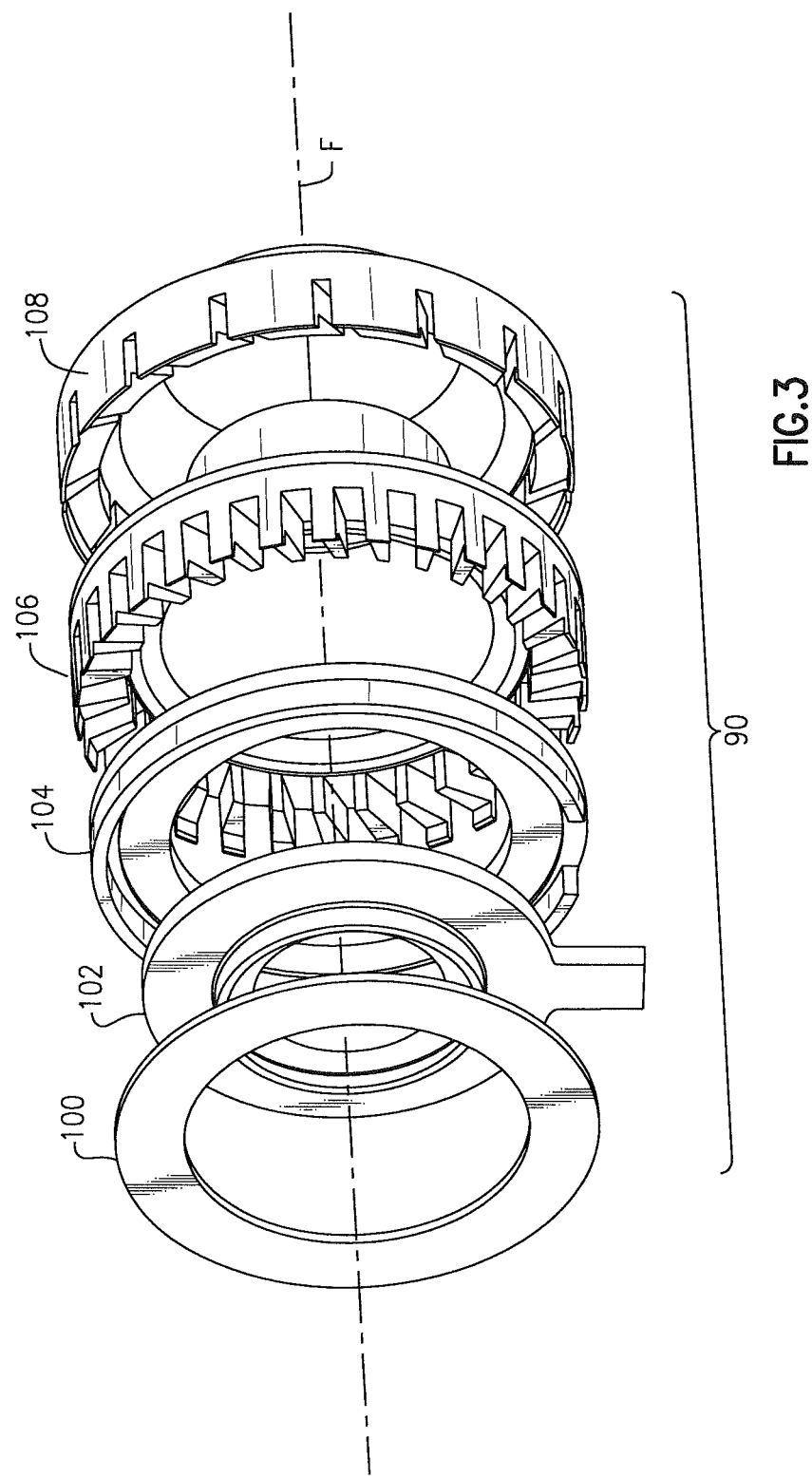
FIG. 3 is an exploded view of a swirler assembly according to one non-limiting embodiment.

With reference to FIG. 3, each of the swirlers 90 generally includes a capture plate 100, a nozzle guide 102, a guide housing 104, a swirler first body 106 and a swirler second body 108. The capture plate 100 is mounted to the guide housing 104 to retain the nozzle guide 102, the nozzle guide 102 is movable with respect to the guide housing 104. It should be appreciated that any number of swirler bodies as well as alternative or additional components may be utilized herewith and that the two part swirler body shown is merely but one example assembly.

Figure 4:
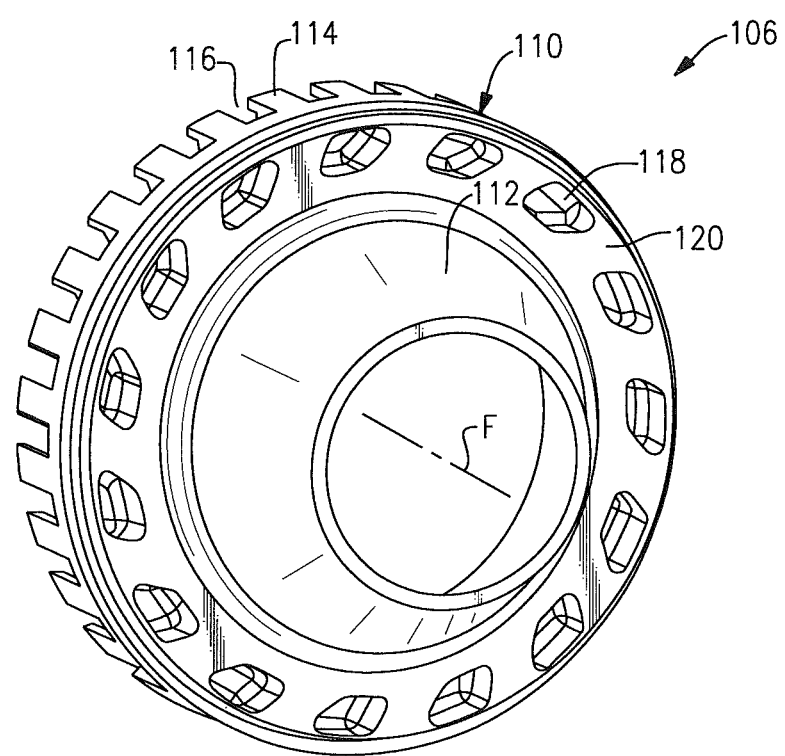
FIG. 4 is an expanded view of a swirler first body.
Figure 5:
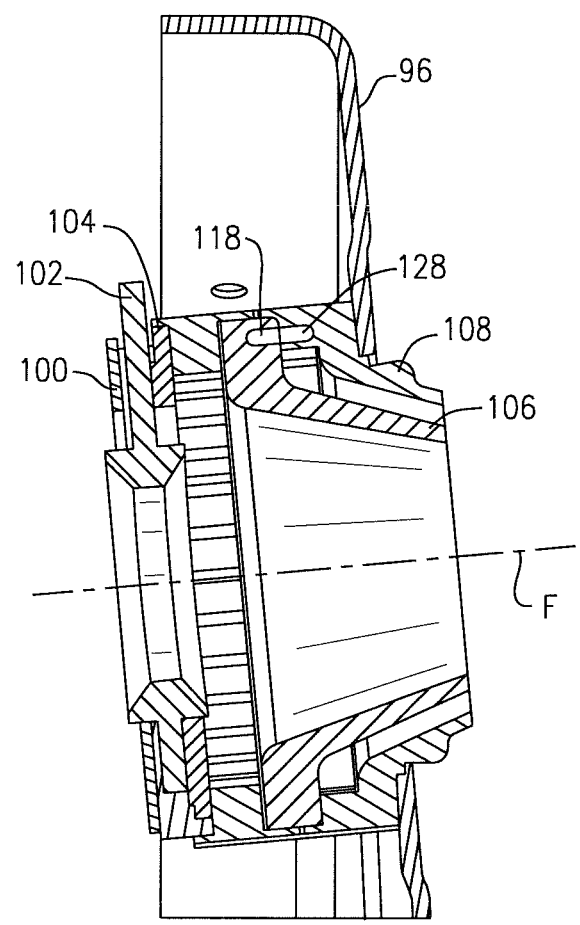
FIG. 5 is a partial sectional view of the swirler assembly of FIG. 3.

With reference to FIG. 4, the swirler first body 106 generally includes a base section 110 and a frustoconical section 112 which extends downstream of the base section 110. The base section 110 includes a multiple of legs 114 defined by a multiple of slots 116 opposite the frustoconical section 112. The slots 116 are generally radial with respect to the centerline F to receive primary combustion core airflow from within the bulkhead support shell 96 toward the fuel nozzle 86 within the chamber 66 for combustion (FIG. 5). It should be appreciated that generally radial as defined herein means transverse to said centerline F but may include an angled component to impart a swirl to the primary combustion core airflow about the centerline F.

A multiple of pockets 118 are formed in and communicate axially through the base section 110 opposite the legs 114. The multiple of pockets 118 in the disclosed non-limiting embodiment are completely contained within a mount face 120 which abuts the swirler second body 108 (FIG. 5).

Figure 6:
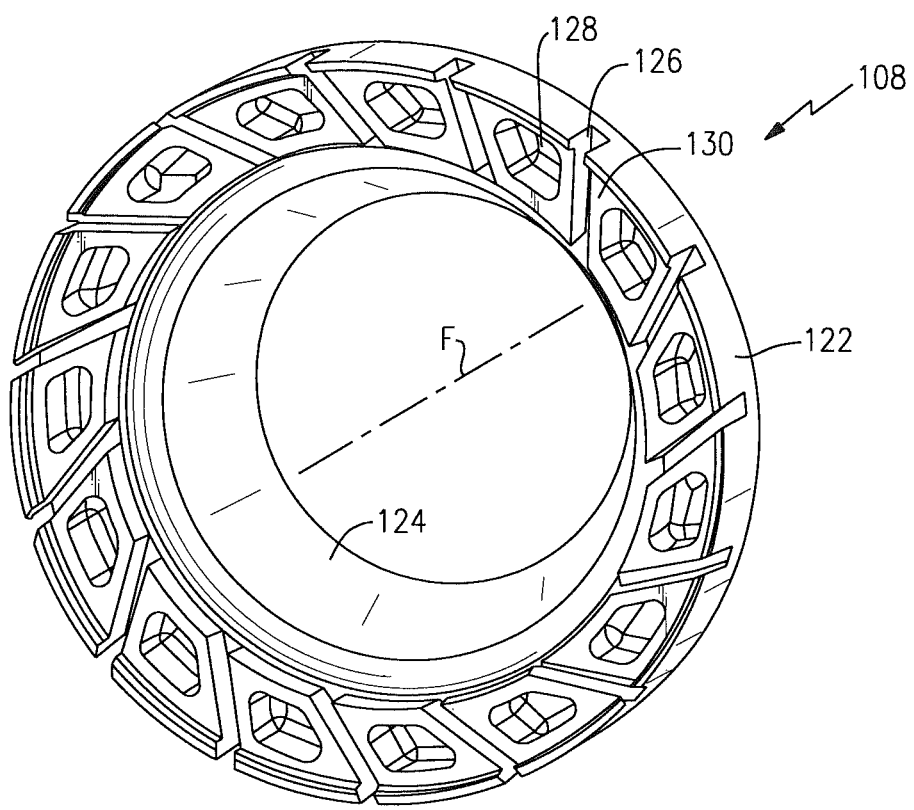
FIG. 6 is an expanded view of a swirler second body.

With reference to FIG. 6, the swirler second body 108 generally includes a base section 122 and a frustoconical section 124 which extends downstream of the base section 122. The base section 122 includes a multiple of slots 126 and a multiple of pockets 128 in a mount face 130 of the swirler second body 108. The multiple of slots 126 are generally radial with respect to the centerline F to receive primary combustion core airflow to be communicated toward the chamber 66 for combustion from within the bulkhead support shell 96 toward the fuel nozzle 86. The multiple of slots 126 may provide counter swirl with respect to slots 116 (FIG. 4).

Figure 7:
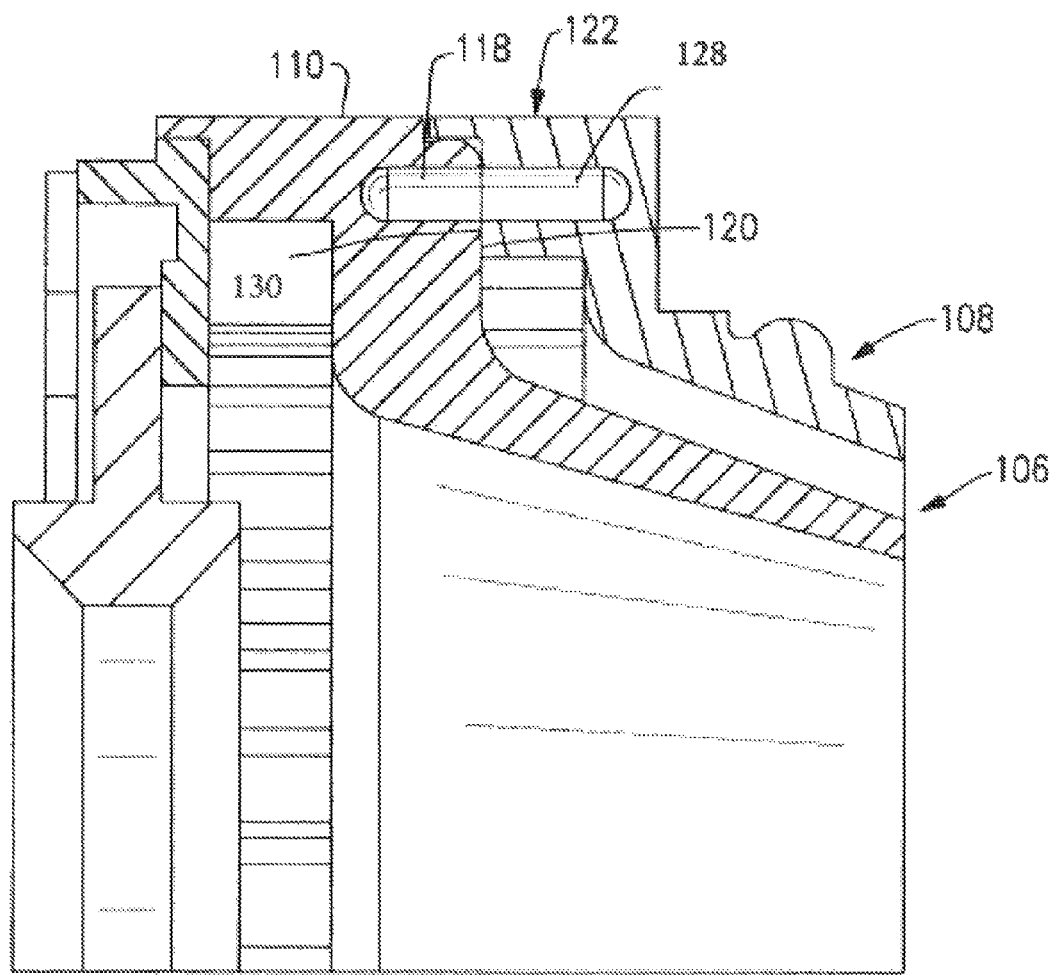
FIG. 7 is an expanded partial sectional view of the swirler assembly of FIG. 3.

The mount face 130 of the swirler second body 108 abuts the mount face 120 of the swirler first body 106 such that the pockets 118, 128 may be in axial association but are not exposed to the primary combustion core airflow (FIG. 7). That is, the pockets 118, 128 form respective single hollow areas contained within the mount faces 120, 130.

The base section 122 at least partially overlaps the base section 110 to seal as well as rotationally locate the swirler first and second bodies 106, 108. That is, a lip of the base section 122 may at least partially surround the base section 110.

The pockets 118, 128 thereby reduce the weight of the swirler 90. It should be appreciated that the pockets 118, 128 may be machined or otherwise formed into a cast component or formed directly through, for example only, Direct Laser Metal Sintering (DLMS).

Figure 8:
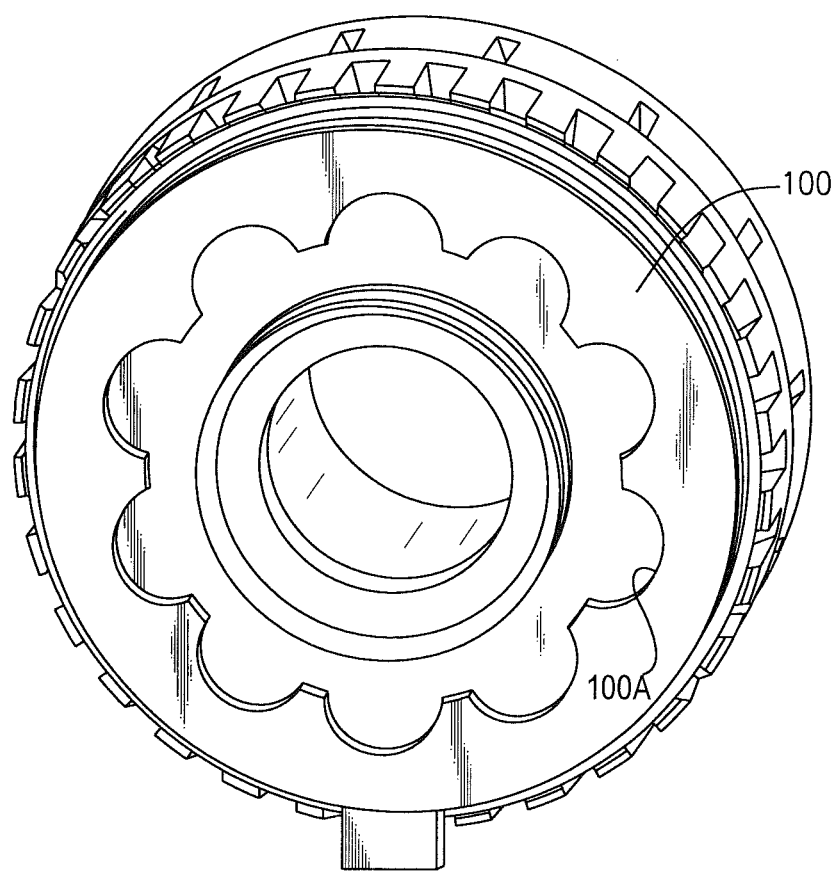
FIG. 8 is an end view of the swirler assembly of FIG. 3.

With reference to FIG. 8, the capture plate 100 may also be lightened through formation of a scalloped inner aperture 100A. It should be appreciated that the scalloping is but one disclosed non-limiting embodiment and various geometries for the inner aperture may be provided such as rectilinear, oval or other non-circular shapes. In the disclosed non-limiting embodiment, each swirler 90 has been lightened by approximately 0.04 pounds (18 grams) which, for example only, in a combustor with eighteen swirlers provides a 0.7 pound (317 gram) weight savings.

Figure 11A:
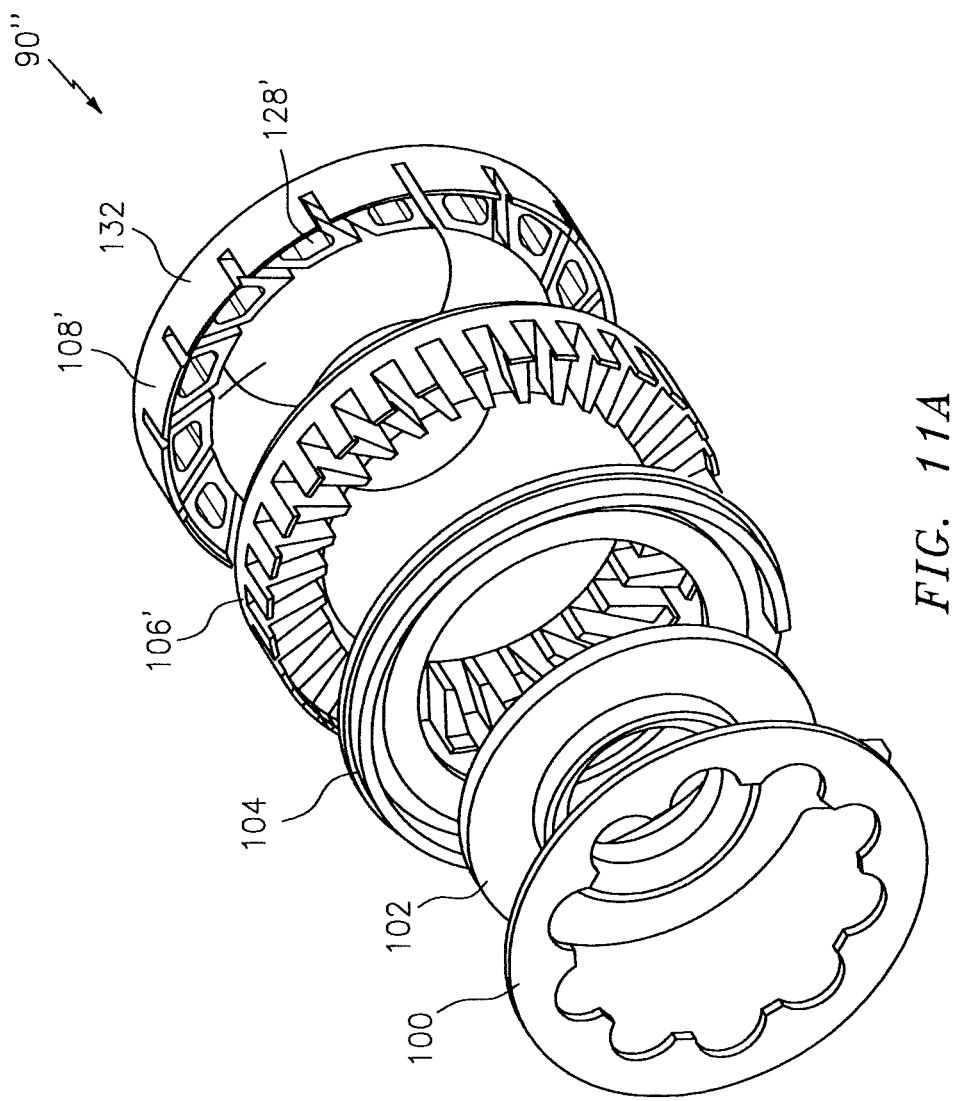
FIGS. 11A-11B illustrate an exploded view of a swirler assembly according to another non-limiting embodiment.
Figure 11B:
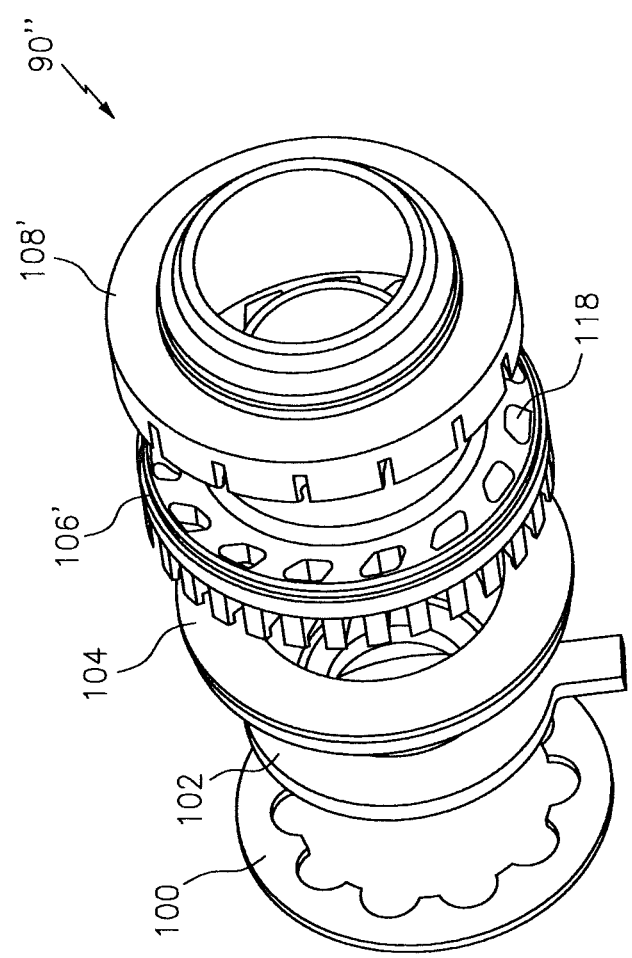

With reference to FIGS. 11A-11B, in another disclosed, non-limiting embodiment, a swirler 90" includes a swirler second body 108' in which the pockets 128' extend through an outer surface 132 such that primary combustion core airflow may enter the pockets 128' and pockets 118 but is trapped therein. That is, the primary combustion core airflow may impinge within the pockets 128', 118 but is not swirled nor communicated toward the combustion chamber 66 for combustion.

Figure 9:
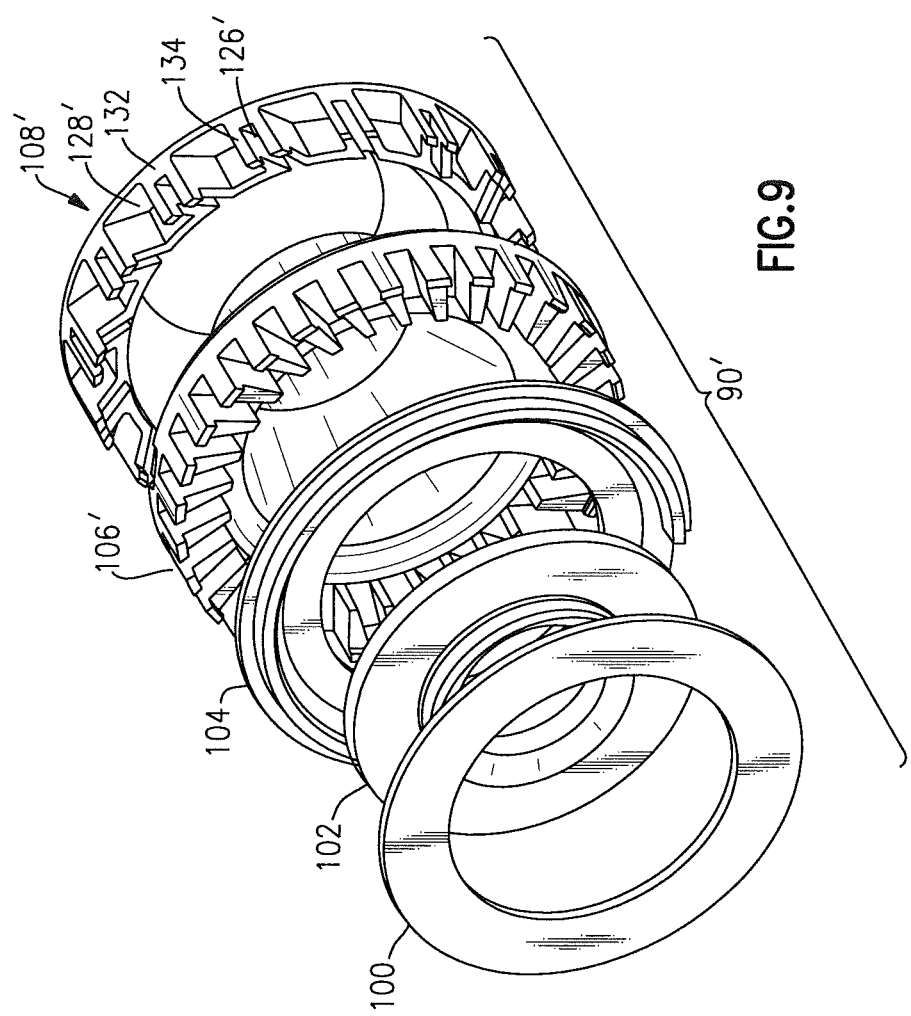
FIG. 9 is an exploded view of a swirler assembly according to another non-limiting embodiment.
Figure 10:
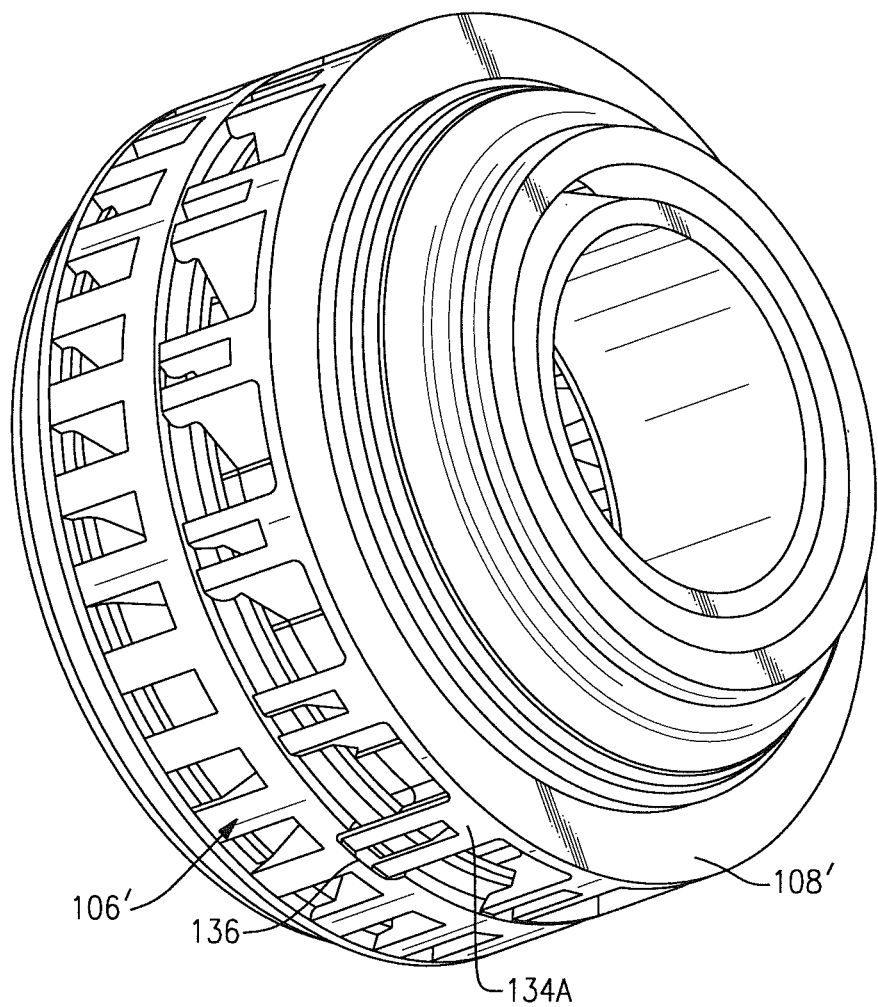
FIG. 10 is an expanded perspective view of the swirler assembly of FIG. 9.

Referring to FIG. 9 (swirler 90') and FIGS. 11A-11B, in some embodiments the pockets 128' are located between each of the multiple of slots 126' such that relatively thin legs 134 are defined, each of which includes one of the multiple of slots 126' which communicate primary combustion core airflow toward the combustion chamber 66 for combustion. At least one of the multiple of legs 134A may be of an extended length to be received within a corresponding axial recess 136 in the swirler first body 106' to assure the swirler first body 106' is properly clocked relative to the swirler second body 108' (FIG. 10). In other words, the pockets 118, 128 are aligned in some manner so as to be sealed off from the primary airflow through the swirler. The pockets 118, 128 do not necessarily have to be aligned one to another so long as there is no interaction with the primary airflow. The clocking feature provides alignment to ensure the swirler first body 106' is properly clocked relative to the swirler second body 108' and can't be misaligned during an assembly process. It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of lightening a swirler assembly for a combustor of a gas turbine engine comprising:
    defining at least one first pocket within an annular first mount face of a first swirler body;
    defining a capture plate that is configured to retain a nozzle guide to include a non-circular inner periphery;
    extending said at least one first pocket through an outer surface of said first swirler body; and
    abutting the annular first mount face of the first swirler body with an annular second mount face of a second swirler body such that a primary combustion core airflow is configured to enter the at least one first pocket and at least one second pocket of the annular second mount face and be trapped therein and impinge within the at least one first pocket and the at least one second pocket but not be swirled or communicated toward a combustion chamber.

2. The method as recited in claim 1, further comprising: defining at least one first pocket adjacent to a slot.

3. A swirler assembly for a combustor of a gas turbine engine comprising:
    a swirler first body with an annular first mount face which defines at least one first pocket; and
    a swirler second body with an annular second mount face that defines at least one second pocket and which abuts said annular first mount face, such that a primary combustion core airflow is configured to enter the at least one first pocket and the at least one second pocket and be trapped therein and impinge within the at least one first pocket and the at least one second pocket but not swirl or communicate toward a combustion chamber;
    wherein said at least one first pocket and said at least one second pocket are in axial association; and
    wherein said at least one first pocket extends through an outer first surface of said swirler first body.

4. The swirler assembly as recited in claim 3, wherein said swirler first body includes a first slot and a second slot which are generally radial with respect to a centerline of said swirler first body, said at least one first pocket between said first slot and said second slot.

5. The swirler assembly as recited in claim 4, wherein said swirler second body includes a third slot and a fourth slot which are generally radial with respect to a second centerline of said swirler second body, said at least one second pocket between said third slot and said fourth slot.

6. The swirler assembly as recited in claim 5, wherein said at least one second pocket communicates through an outer second surface of said swirler second body.

7. The swirler assembly as recited in claim 6, wherein said outer second surface is cylindrical.

8. The swirler assembly as recited in claim 3, further comprising a guide housing mounted to said swirler first body.

9. The swirler assembly as recited in claim 8, wherein a nozzle guide is mounted to said guide housing.

10. The swirler assembly as recited in claim 9, wherein a capture plate is mounted to said guide housing to retain said nozzle guide, said nozzle guide movable with respect to said guide housing.

11. The swirler assembly as recited in claim 9, wherein a capture plate is mounted to said guide housing to retain said nozzle guide.

12. The swirler assembly as recited in claim 11, wherein said capture plate is annular.

13. The swirler assembly as recited in claim 12, wherein said capture plate includes a scalloped inner periphery.

\* \* \* \* \*